United States Patent [19]
Sogi et al.

[11] Patent Number: 5,848,805
[45] Date of Patent: *Dec. 15, 1998

[54] BAG FOR AN AIRBAG FOR A VEHICLE

[75] Inventors: Hidehito Sogi; Kazuhiro Nakayama; Toru Ozaki; Masahiro Ushio, all of Aichi-ken, Japan

[73] Assignee: Toyo Tire & Rubber Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 625,059

[22] Filed: Mar. 29, 1996

[51] Int. Cl.⁶ ...................................... B60R 21/20
[52] U.S. Cl. .......................... 280/743.2; 280/742
[58] Field of Search ............... 280/742, 743.2

[56] References Cited

U.S. PATENT DOCUMENTS

| | | | |
|---|---|---|---|
| 4,934,734 | 6/1990 | Takada | 280/742 |
| 5,172,933 | 12/1992 | Strasser | 280/740 |
| 5,172,934 | 12/1992 | Frantz et al. | 280/742 |
| 5,282,646 | 2/1994 | Melvin et al. | 280/742 |
| 5,464,250 | 11/1995 | Sato | 280/743.2 |
| 5,573,270 | 11/1996 | Sogi et al. | 280/743.2 |

FOREIGN PATENT DOCUMENTS

| | | |
|---|---|---|
| 0600598A1 | 6/1994 | European Pat. Off. . |
| 4121659A1 | 1/1993 | Germany . |
| 51-31581 | 9/1976 | Japan . |
| 53-45574 | 12/1978 | Japan . |
| 1-150156 | 10/1989 | Japan . |
| 3-82647 | 4/1991 | Japan . |
| 5-208648 | 8/1993 | Japan . |
| 6-1010 | 1/1994 | Japan . |

*Primary Examiner*—Kenneth R. Rice
*Attorney, Agent, or Firm*—Jordan and Hamburg

[57] ABSTRACT

In a bag for a vehicle air bag device according to this invention, tethers are installed at positions clear of the spouting direction of gas from a flow regulator. Therefore, the flow regulating effect provided by the flow regulator is not impaired by the tethers, allowing the gas flow to be reliably directed diametrically outward toward the outer periphery of the bag, whereby the deployment speed of the bag moving toward the occupant can be reduced.

Further, in a bag for a vehicle air bag device according to this invention, a folding system which allows less easy spreading is employed in the spouting direction of gas from the flow regulator. Therefore, the gas flow can be uniformly led in two mutually opposite directions, thereby making it possible to reduce the deployment speed of the bag moving toward the occupant.

15 Claims, 13 Drawing Sheets

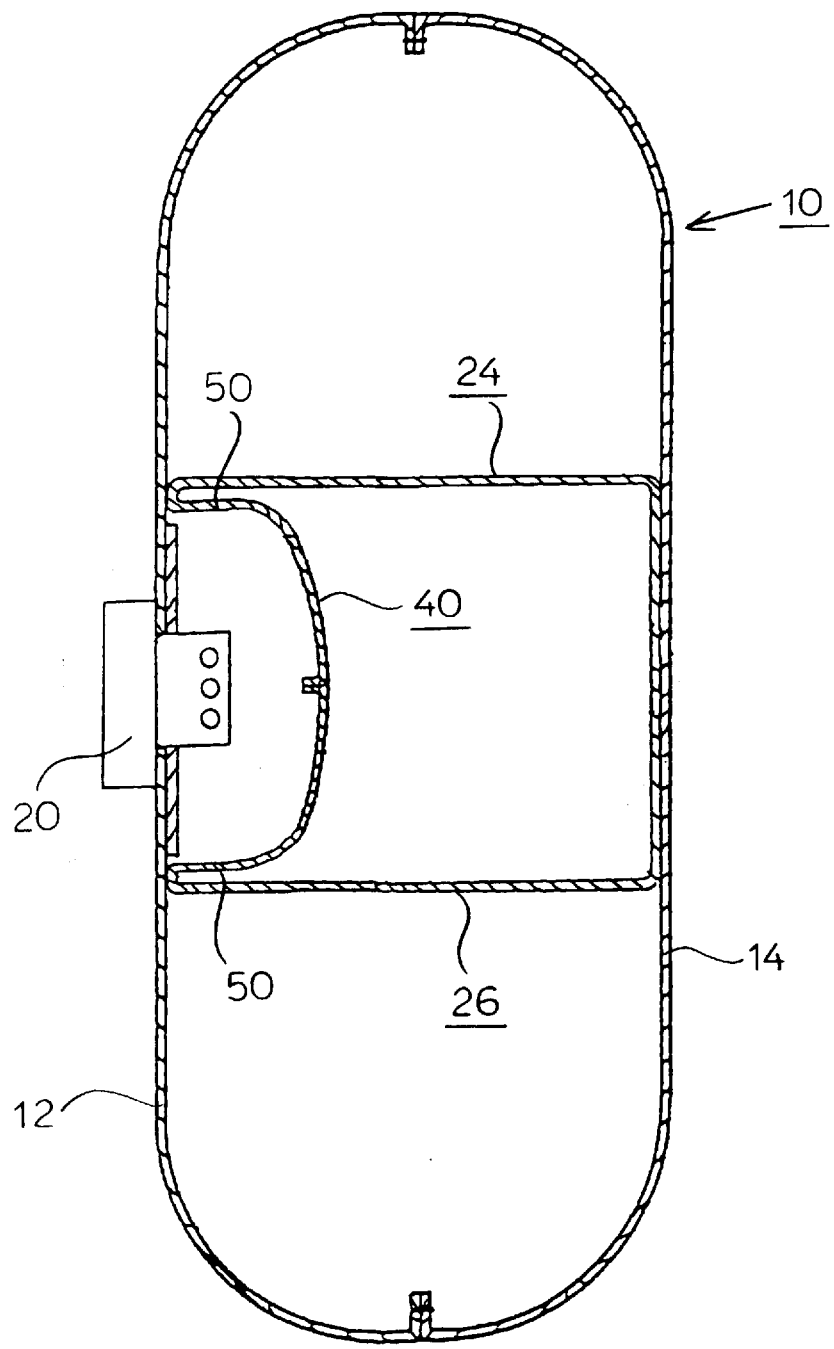

1

BAG FOR AN AIRBAG FOR A VEHICLE

BACKGROUND OF THE PRESENT INVENTION

This invention relates to a bag for a vehicle air bag device.

A bag for a vehicle air bag device is known which comprises an occupant-associated panel and an inflator-associated panel which are joined together along their peripheral edges to form a flexible bag construction which is inflatable into a three-dimensional form (see Japanese Patent Publication No. Sho 51-31581). An inflator is attached to such bag. Upon vehicle collision, the gas produced in the inflator instantaneously flows into the bag, inflating the latter to protect the occupant against the shock due to the collision.

In the bag for a vehicle air bag device, the occupant-associated panel and inflator-associated panel are connected by tethers. The intention is to prevent the spacing between the occupant-associated panel and the inflator-associated panel from becoming greater than the length of the tethers when the bag is inflated.

Thus, the deployment distance of the bag, i.e., the amount of displacement of the occupant-associated panel is controlled by the tethers. (The distance from the plane of the steering wheel at that place on the occupant-associated panel which is nearest to the occupant is called the deployment distance.) However, with tethers alone, the deployment speed of the bag cannot be reduced. (The speed at which that place on the occupant-associated panel which is farthest from the plane of the steering wheel moves in the direction orthogonal to the plane of the steering wheel, i.e., axially of the steering wheel is called the deployment speed.) If the deployment speed is high, there is the possibility of the bag, when inflated, coming into contact with the occupant at a relatively high speed Further, with the tethers alone, it cannot be expected that the bag will quickly spread toward its outer periphery, i.e., in the direction orthogonal to the displacement, direction for example, toward the occupant's abdominal region. Nor can control of deployment in another manner be expected.

Therefore, in order to decrease the deployment speed and secure quick spreading in the direction orthogonal to the displacement direction, some of the known bags for vehicle air bag devices include a flow regulator adapted to divert the gas flow in the vicinity of the inflator to prevent it from directly hitting the occupant-associated panel (Japanese Patent Publication No. Sho 53-45574, U.S. Pat. No. 5,172,933, EP 600598, and DE 4121659).

However, it has been found that with the regulator alone, the deployment distance cannot be controlled and that the deployment speed can be reduced only to a limited degree.

Therefore, it may be contemplated to provide an air bag with tethers and a flow regulator so that the air bag may have the merits of both, in which case, however, the problem is that if the flow regulator is disposed in the spouting direction of gas, the gas flow diverted by the tethers dashes against the tethers, detracting from the effect of flow regulation.

Therefore, a first object of this invention is to provide an air bag wherein, although it combines tethers with a flow regulator, the effect of flow regulation by the flow regulator is not lost and, with the air bag considered as a whole, both the deployment distance and the deployment speed are reduced, and the bag quickly spreads toward the outer periphery.

Further, the bag is suitably folded and stored in a housing installed in the middle of the steering wheel or the like. In this case, the upper and lower sides and the laterally opposite sides of the bag are often folded in a bellows fashion. The bellows type folding allows the folded sides to spread with ease. Therefore, when such bellows type folding is present in the vertically opposite sides and the horizontally opposite sides, the bellows type folded portions in the vertically opposite sides spread smoothly if the spouting direction of gas from the flow regulator is vertical; thus, the gas concentratedly moves that direction. And the gas which has reached the upper and lower ends of the bag changes its direction to dash against the occupant-associated panel. Thus, with such folding system, the deployment speed of the bag cannot be reduced.

Accordingly, a second object of the invention is to provide an air bag having a flow regulator, wherein a particular folding system is employed in connection with the spouting direction of the gas flow reverted by the flow regulator, whereby the deployment speed is reduced.

SUMMARY OF THE PRESENT INVENTION

According to this invention, a bag for a vehicle air bag device is characterized in that in the interior of said bag construction, a flow regulator is disposed by which a gas flow spouting from the inflator is diverted toward the outer periphery of said bag construction, and said occupant-associated panel and said inflator-associated panel are connected by tethers which prevent the spacing between the two panels from exceeding a predetermined length, said tethers being disposed at positions where they do not obstruct the flow of gas diverted by said flow regulators. This bag does not lose the effect of flow regulation provided by the flow regulator and has the merits of both the tethers and the flow regulator.

As a preferred embodiment of the invention, said flow regulator is a sheet which covers said inflator attaching opening, the middle portion of said sheet having a slack bulging toward said inflator-associated panel, said sheet being joined at at least two places on the peripheral edge thereof to said inflator-associated panel to form joined portions, and the spacing between a place on the peripheral edge of said sheet, other than said joined portions and said inflator-associated panel, may form openings for the reverted gas flow.

In this case, said tethers may be joined to said inflator-associated panel at places which are diametrically outside said joined portions, such arrangement being advantageous from the standpoint of manufacture of the bag. Further, said tethers are composed of said flow regulator, and connecting members which connect said flow regulator and said occupant-associated panel at those places on said flow regulator which may be nearer to said occupant-associated panel than are said joined portions.

Further, according to this invention, a bag for a vehicle air bag device mentioned at the outset is characterized in that in the interior of said bag construction, a flow regulator is disposed which diverts a gas flow spouting from the inflator, said flow regulator being provided with spout openings so that the gas, after being diverted, may flow in two mutually opposite directions toward the outer periphery of said bag construction, and a first pair of opposed sides of said bag construction are folded in said gas spouting direction and a second pair of opposed sides are folded in the direction orthogonal to said gas spouting direction, the folding of said first pair of sides allowing less easy deployment than the folding of said second pair of sides. Thus, the folding in the spouting direction of the gas from the flow regulator is such that it allows essentially less easy spreading attended by less easy gas flow, while the folding in the direction orthogonal to said spouting direction of the gas flow is such that it allows essentially easy spreading attended by easy gas flow; therefore, the gas spreads relatively uniformly toward the entire outer periphery of the bag. Therefore, the pressure in the bag pressing the occupant-associated panel is distributed, and hence the deployment speed of the bag can be reduced.

In this case, first, said second pair of sides may be folded in a bellows fashion, and then said first pair of sides may be folded in a reverse roll fashion. In this case, the bellows type folding is the folding which allows easy spreading, and the reverse roll type folding is the folding which allows less easy spreading.

Further, in this case, said occupant-associated panel and said inflator-associated panel are connected together by tethers which prevent the distance between said two panels from exceeding a predetermined length, said tethers being disposed at positions not to obstruct the gas flow diverted by the flow regulator. This arrangement enhances the effect of reduction of the deployment speed of the bag.

In the thus-folded bag, advantageously the projecting height of said flow regulator is not more than ⅔ of the projecting height of said occupant-associated panel. If the projecting height of said flow regulator exceeds ⅔, then the flow regulating effect is considerably decreased, increasing the deployment speed of the bag.

Further, advantageously the width of said flow regulator is greater than the diameter of said inflator head. If the width of said flow regulator should be less than the diameter of said inflator head, this also detracts from the flow regulating effect and increases the deployment speed of the bag.

Further, in said various kinds of bags, said flow regulator may be made of a material which is impermeable to gas. With this arrangement, since the gas does not permeate the flow regulator, it is diverted without fail.

BRIEF DESCRIPTION OF THE DRAWINGS

FIG. 7 is a sectional view, similar to FIG. 1, showing a bag according to yet another embodiment of the invention;

DETAILED DESCRIPTION OF THE PRESENT INVENTION

Figure 1:
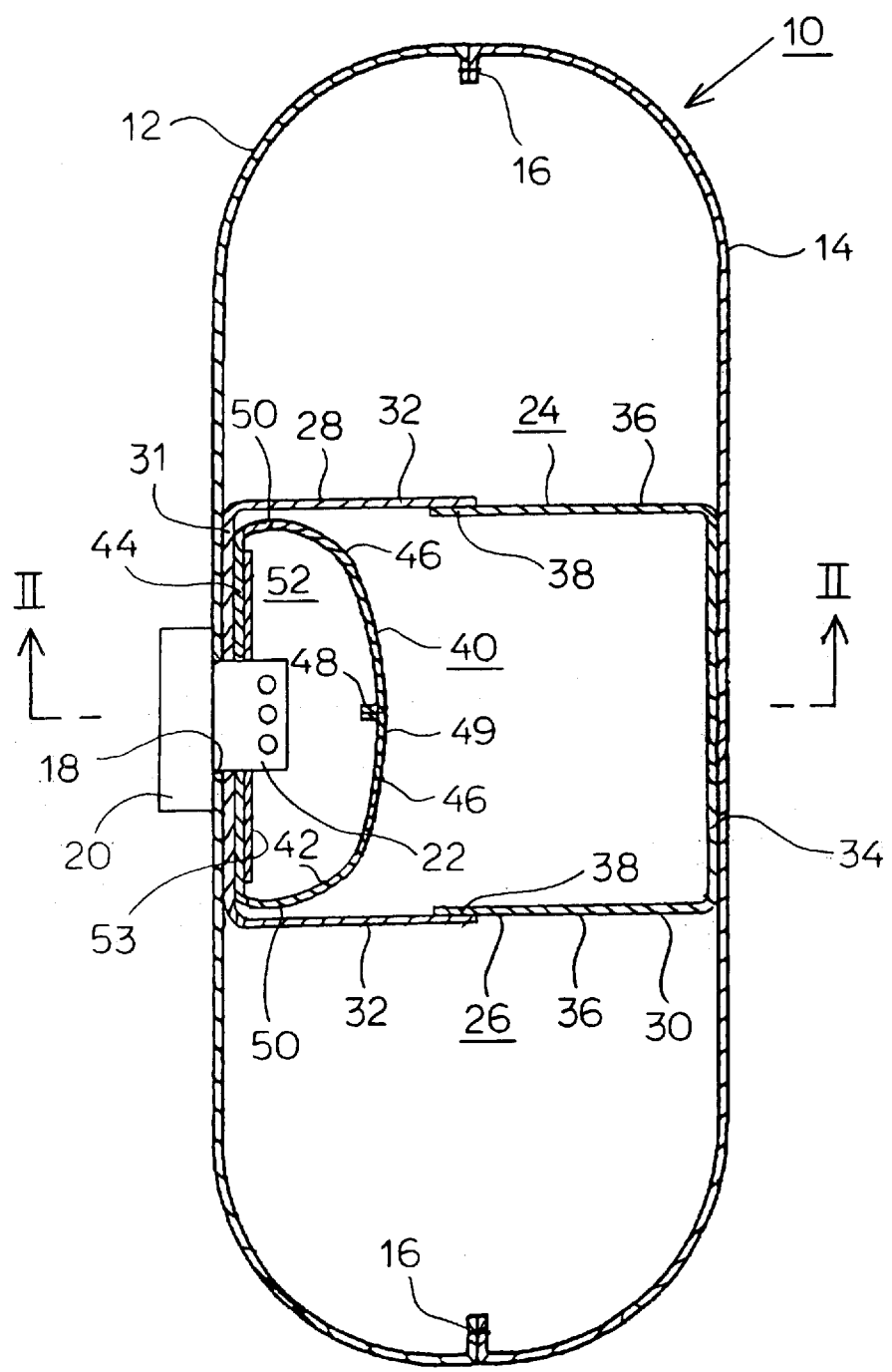
FIG. 1 is a cross-sectional view showing a bag for a vehicle air bag device in its inflated state according to an embodiment of the invention.
Figure 2:
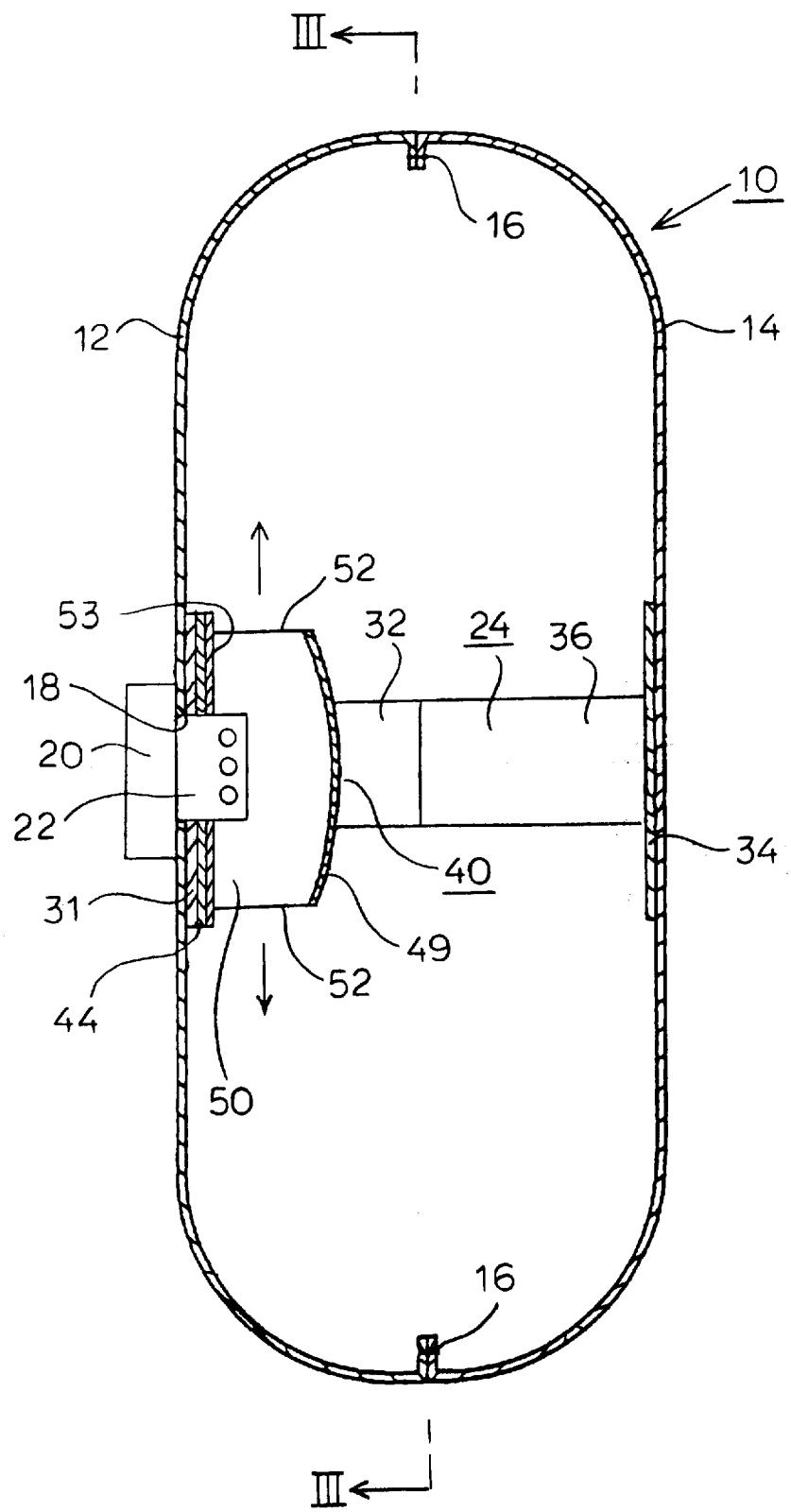
FIG. 2 is a sectional view taken along the line II—II in FIG. 1.
Figure 3:
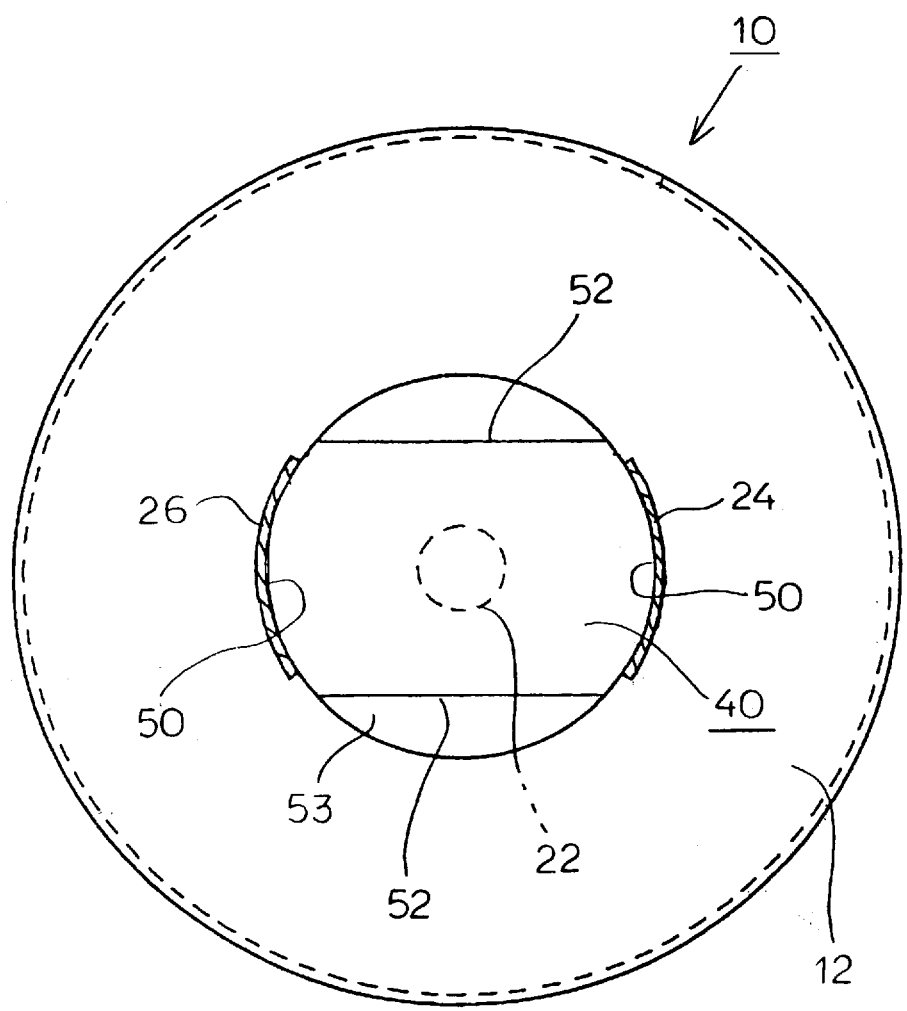
FIG. 3 is a sectional view taken along the line III—III in FIG. 2.
Figure 4:
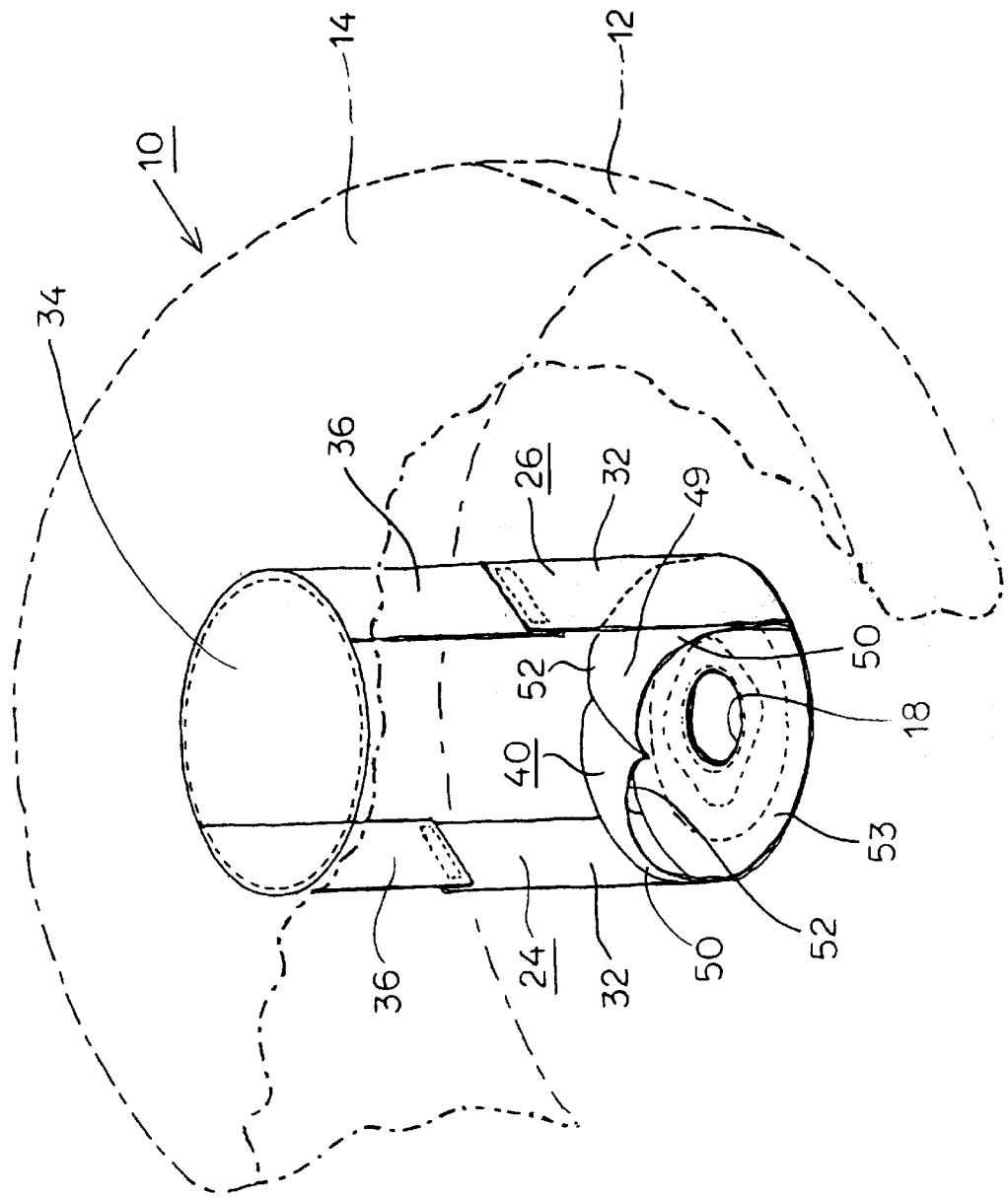
FIG. 4 is a perspective view of said bag.

FIGS. 1 through 4 show a bag for a vehicle air bag device according to an embodiment of this invention.

The bag 10 comprises an inflator-associated panel 12 and an occupant-associated panel 14. These panels 12 and 14 are circular and made of a flexible material, such as cloth. The two panels 12 and 14 are sewn together as at 16 along their peripheral edges to form a bag construction. (For the sake of simplicity, the sewn portions are all omitted from the accompanying drawings.) Centrally formed in the inflator-associated panel is a circular port 18, in which the head 22 of the inflator 20 is inserted. The gas spouting from the inflator 20 inflates the air bag 10 into a three-dimensional form, as shown.

The numerals 24 and 26 denote strap-like tethers made of a flexible material, such as cloth, serving to connect the inflator-associated panel 12 and the occupant-associated panel 14 and prevent the distance between the panels 12 and 14 from becoming greater than the tether length. The two tethers 24 and 26 are disposed on the diameter of the bag symmetrically with respect to the circular port 18. Thereby, when the bag 10 has been deployed into the inflation-completed state, it retains a uniform flat shape, as shown. In this embodiment, the tethers 24 and 26 comprise a first tether forming cloth 28 sewn to the inflator-associated panel 12, and a second tether forming cloth 30 sewn to the occupant-associated panel 14. The first tether forming cloth 28 comprises a circular base portion 31, and two leg portions 32 extending diametrically outward from two opposed places on the peripheral edge of said base portion 31 and having a width less than the diameter of said base portion 31, said base portion 31 being sewn to the inflator-associated panel 12. Similarly, the second tether forming cloth 30 comprises a circular base portion 34, and two leg portions 36 extending diametrically outward from two opposed places on the peripheral edge of said base portion 34 and having a width less than the diameter of said base portion 34, said base portion 34 being sewn to the occupant-associated panel 14. The two pairs of leg portions 32, 32 and 36, 36 are respectively sewn together as at 38, 38, thus forming said tethers 24 and 26.

The numeral 40 denotes a flow regulator made of a flexible material, such as cloth. The flow regulator 40 is positioned such that when the bag 10 is inflated, the flow regulator is at some distance from the inflator-associated panel 12. The flow regulator 40 has a width greater than the diameter of the inflator attaching opening 18, covering the latter. The flow regulator 40 is formed as a portion of a flow regulator forming cloth 42. The flow regulator forming cloth 42 comprises a circular base portion 44, and two leg portions 46 extending diametrically outward from two opposed places on the peripheral edge of said base portion 44. This base portion 44 is sewn from above the base portion 31 of said tether to the inflator-associated panel 12. The free ends of the two leg portions 46 are sewn together as at 48, thereby providing the annular flow regulator 40. In this manner, the flow regulator 40 is joined at its two opposite sides 50, 50 to the inflator-associated panel 12 but it is not sewn at the other opposed sides 52, 52 thereof to the inflator-associated panel 12. These non-sewn sides 52 form spout openings for gas flow.

Disposed on the base portion 44 of the flow regulator forming cloth 42 is a reinforcing cloth 53 of substantially the same shape as said base portion. This reinforcing cloth 53 is sewn from above the base portion 31 of the first tether forming cloth 28 and the base portion 44 of the flow regulator forming cloth 42 to the occupant-associated panel 12.

The gas spouting from the inflator 20 dashes against the top 49 and joined portions 50 of said flow regulator 40 and is thereby diverted, then flowing diametrically outward through the spout openings 52. Thus, the gas flow does not directly push the occupant-associated panel 14 toward the occupant. Therefore, the deployment speed of the occupant-associated panel reduced.

As is obvious from the above description, the tethers 24 and 26 are disposed clear of the spout openings 52. That is, the tethers 24 and 26 are attached diametrically outside the places 50 where the flow regulator 40 is joined to the inflator-associated panel 12. Therefore, the gas flow diverted by the flow regulator 40 and passing through the spout openings 52 (see arrows in FIG. 2) is not obstructed by the tethers 24 and 26. Thus, the air bag in this embodiment is capable of achieving two effects, one of limiting the deployment of the bag to a given distance by means of the tethers and the other of reducing the deployment speed of the occupant-associated panel 14 by means of the flow regulator 40.

Figure 5:
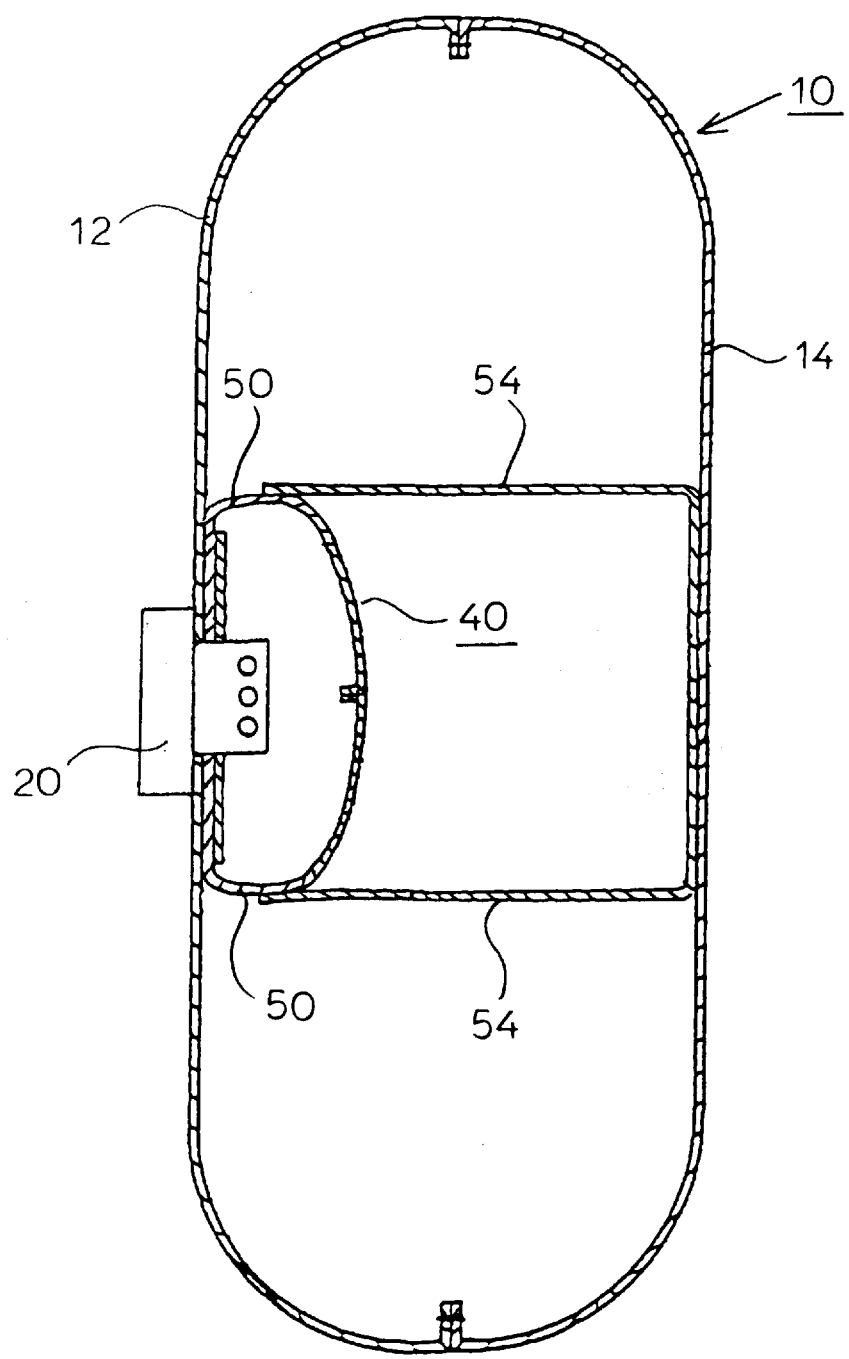
FIG. 5 is a sectional view, similar to FIG. 1, showing a bag according to another embodiment of the invention.

In the above embodiment, the flow regulator and tethers have been separately prepared. Alternatively, however, as shown in FIG. 5, the opposite sides 50 of the flow regulator 40 may be connected to the occupant-associated panel 14 by connecting members 54 similar to the second tether forming cloth 30 shown in FIG. 1. In that case, the flow regulator 40 and the connecting members 54 cooperate with each other to constitute the tether.

Figure 6:
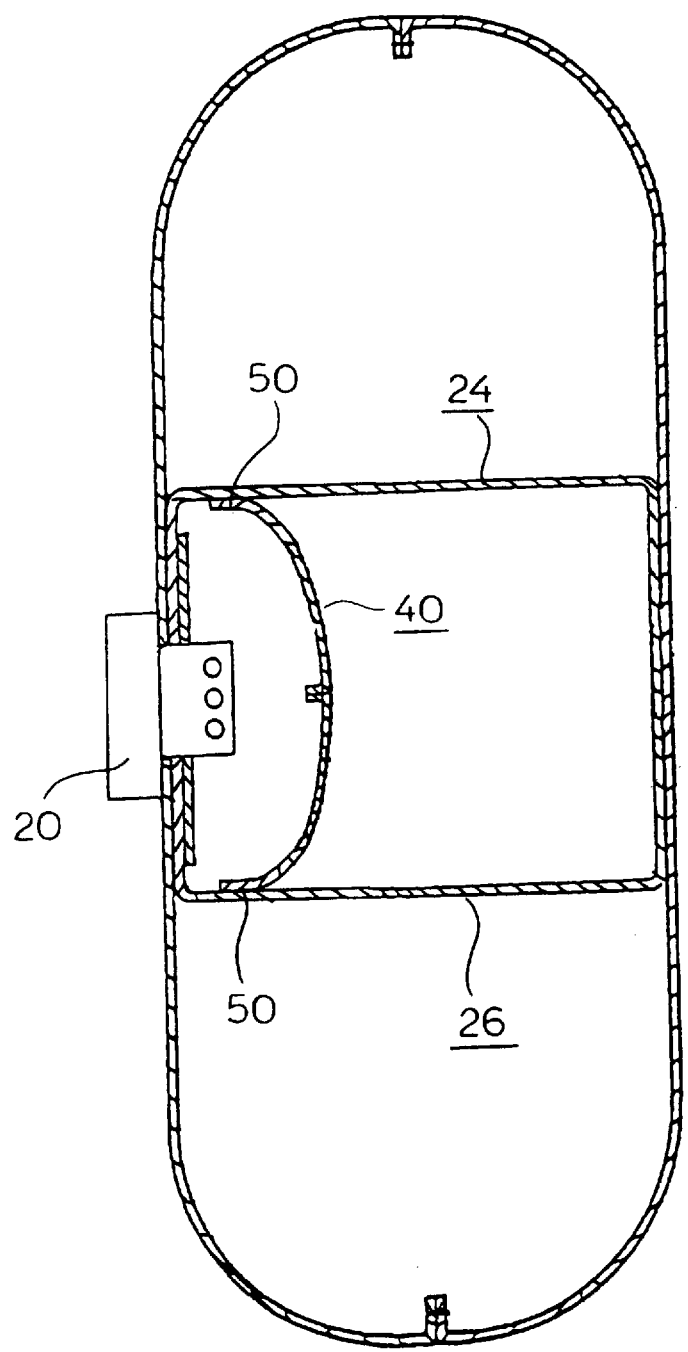
FIG. 6 is a sectional view, similar to FIG. 1, showing a bag according to still another embodiment of the invention.

Reversely, as shown in FIG. 6, the opposite sides 50 of the flow regulator 40 may be sewn to the inner surfaces of the tethers 24 and 26, with the flow regulator 40 itself not being directly sewn to the inflator-associated panel.

Further, as shown in FIG. 7, the flow regulator 40 and tethers 24 and 26 may be formed of a single sheet of cloth such that the opposite sides 50 of the flow regulator 40 are once sewn to the inflator-associated panel 12 and then the tethers 24 and 26 which are extensions thereof are extended to the occupant-associated panel 14.

Though not shown, the bag body may have tethers alone attached thereto, and separately therefrom, an inflator having a flow regulator attached thereto is prepared, said inflator being attached to the inflator-associated panel to position the flow regulator within the bag.

The diameters of the inflator-associated panel and occupant-associated panel are 500–800 mm in the flat state of the bag. And the size of the flow regulator is such that the width is 50–300 mm and the length is 50–400 mm, which size is preferable from the standpoint of reducing the deployment speed of the bag. In this case, the "length" is the length of the flow regulator as measured between the sewn portions closest to the peripheral edge when the base portion of the flow regulator forming cloth is sewn to the inflator-associated panel, i.e., the length of slack of the flow regulator inflated toward the occupant-associated panel. Further, the length of the tethers is 150–300 mm, for example.

EXAMPLE 1

Figure 8A:
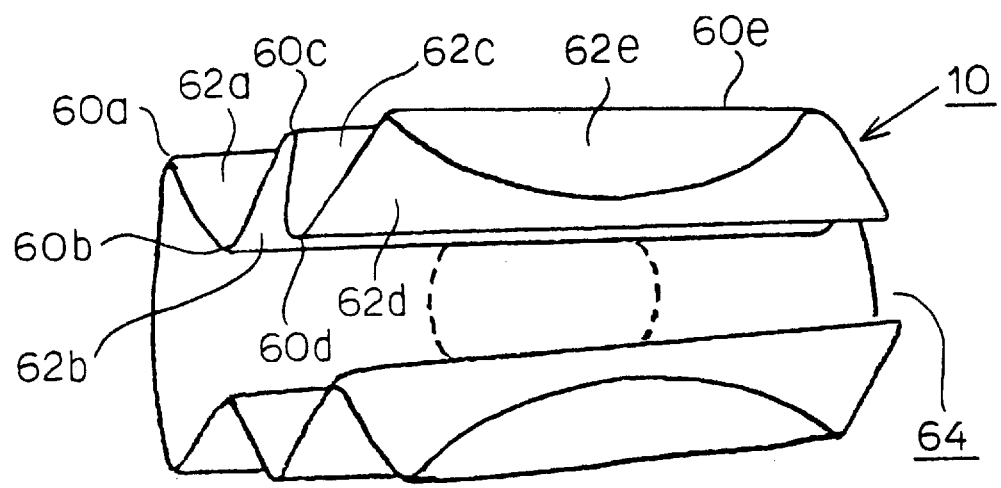
FIG. 8 shows a folding system for the bag of Example 1, (a) showing the first folding step, (b) showing the second folding step.
Figure 8B:
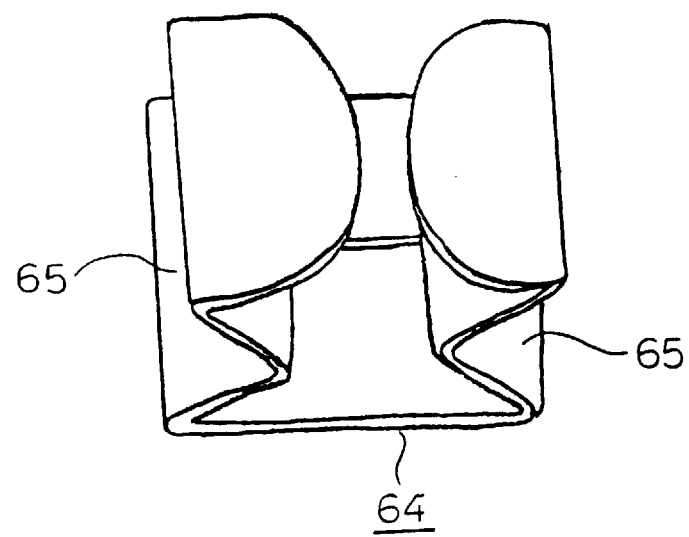

Tests were made using the bag of FIGS. 1 through 4 to prove that the deployment speed is reduced. In that case, the flow regulator used was 250 mm wide and 250 mm long. This width is considerably great, as compared with the diameter of the opening, which is 90 mm, for the inflator. Further, the projecting height of the flow regulator is about ⅓ of the projecting height of the occupant-associated panel. And the bag was positioned to allow the gas flow after being regulated to move vertically. That is, the spout openings 52 in the flow regulator 40 were vertically directed and the tethers 24 and 26 were transversely, that is, horizontally positioned. In this connection, it is to be noted that the bag folding system is also important as a factor influencing the deployment speed of the bag. In the tests conducted, the upper and lower sides of the bag 10 were folded onto the occupant-associated panel 14 in a bellows fashion, as shown in FIG. 8(a). That is, the upper and lower sides of the bag 10 were folded at a series of places 60a, 60b, 60c, 60d, 60e . . . positioned in the range from the middle of the bag 10 to the upper and lower peripheral edges, thereby providing a plurality of folded pieces 62a, 62b, 62c, 62d, 62e . . . successively stacked on the occupant-associated panel 14. Then, as shown in FIG. 8(b), the opposite lateral sides 65 of the folded body 64 thus obtained were folded on the occupant-associated panel 14 likewise in a bellows fashion. The thus-folded bag is referred to as Example 1. On the other hand, the air bag of Comparative Example 1 differs from Example 1 only in that the tethers are disposed outside the gas spout opening in the flow regulator (that is, the tethers are in a position to obstruct the spouting of gas); in the other respects, it is the same as in Example 1.

In the bags of Example 1 and Comparative Example 1, gas was evolved from the inflator, causing the gas flow to deploy the bag, and the deployment speed was measured. In the case of Example 1, in contrast to Comparative Example 1, the deployment speed was about 55% that of Comparative Example 1; at a point where the deployment distance was 250 mm. Thus, by disposing the tethers at places clear of the gas spouting from the flow regulator, the deployment speed of the bag, can be reduced.

EXAMPLE 2

Figure 9A:
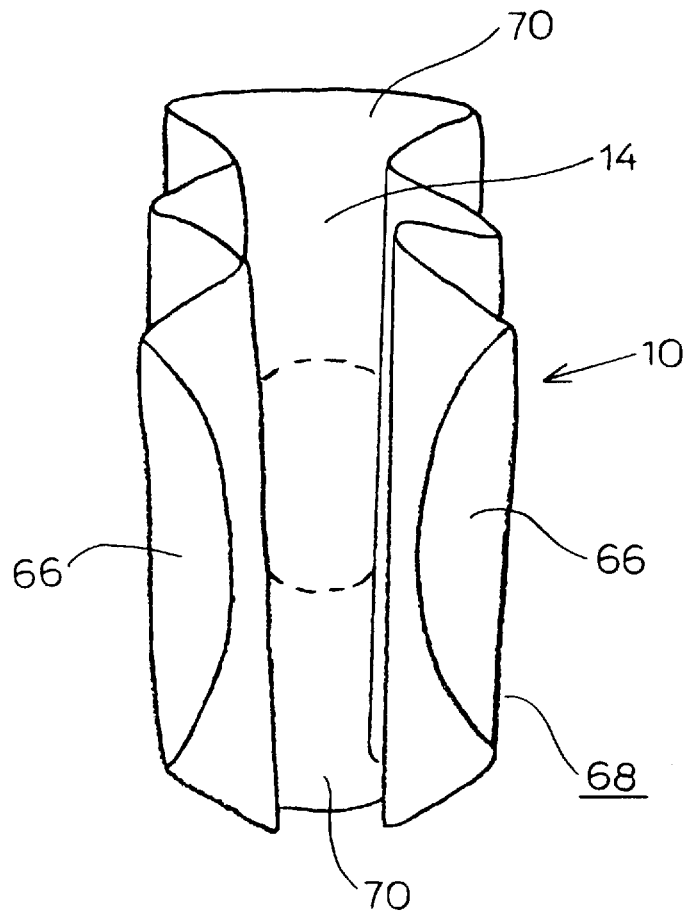
FIG. 9 is a view, similar to FIG. 8, showing a folding system for the bag of Example 2.
Figure 9B:
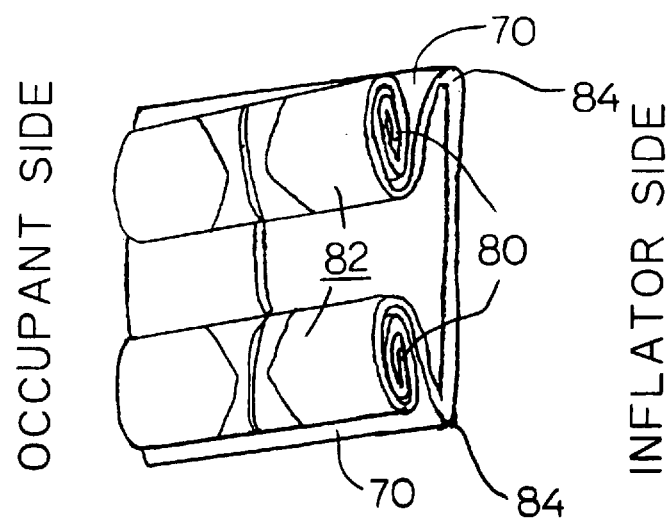

As in Example 1, the bag shown in FIGS. 1 through 4 (in which bag the flow regulator was 170 mm wide and 180 mm long) was used and it was positioned such that the direction of the gas flow after flow regulation was vertical. However, the folding system used differed from that used in Example 1. That is, as shown in FIG. 9(a), first, the opposite lateral sides 66 of the bag were folded onto the occupant-associated panel 14 in a bellows fashion, and then, the upper and lower sides 70 of the folded body 68 thus obtained were folded using a reverse roll type, as shown in FIG. 9(b).

Figure 10A:
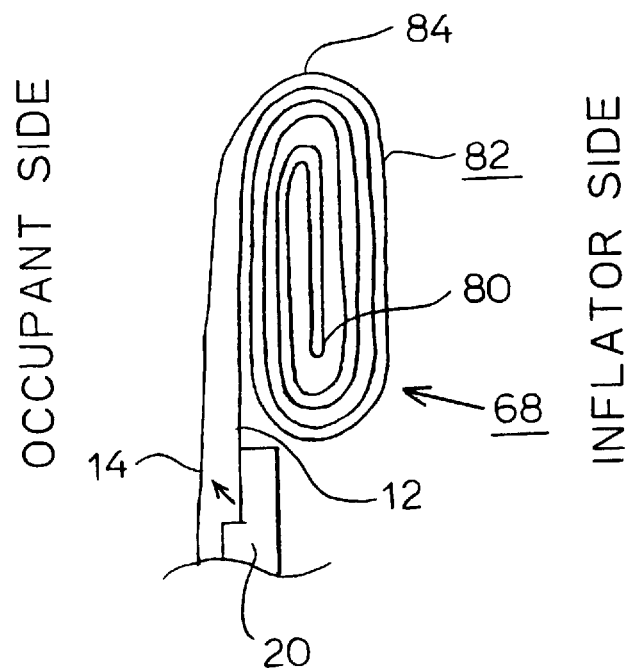
FIG. 10 is a schematic view showing a reverse roll folding system, (a) showing the state before reversion to the occupant-associated panel, (b) showing the state after reversion.
Figure 10B:
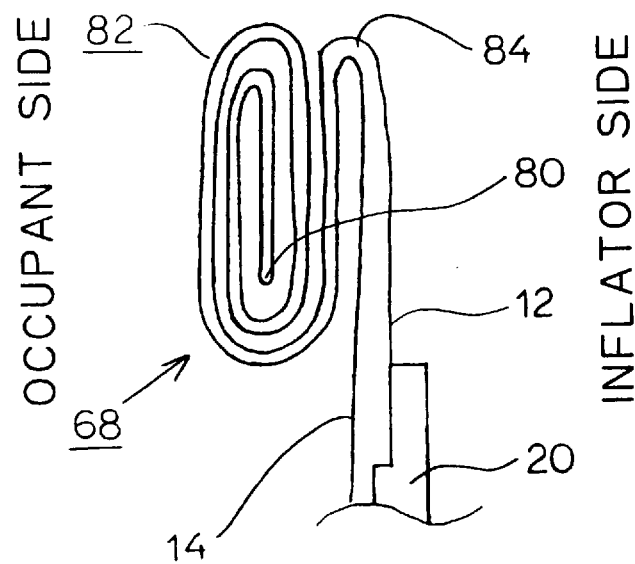
Figure 11:
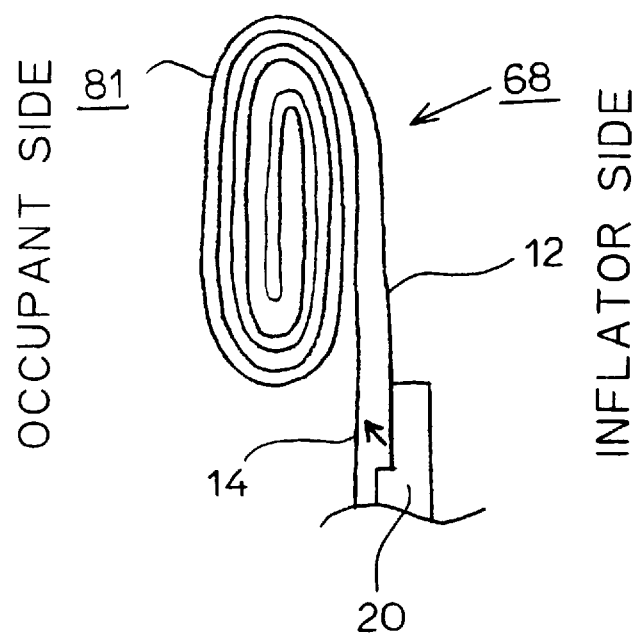
FIG. 11 is a schematic view showing a forward roll folding system.

The "reverse roll type" folding mentioned herein refers to a state in which, as shown in FIG. 10(a), the terminal end of the side of the bag is wound and folded onto the side of the inflator-associated panel 12. Whereas the folding system in which, as shown in FIG. 11, the terminal end of the side of the bag is wound and folded onto the side of the occupant-associated panel 14 is called the forward roll type folding system, it is called the "reverse" roll type folding system in that the bag is reversely folded. To describe in more detail with reference to the drawings, in the case where the reverse roll type folding is to be effected in the upper and lower sides 70 of the bag, as shown in FIG. 9(b), the upper and lower sides 70 of the folded body 68 shown in FIG. 9(a) are successively folded with the front ends 80 thereof disposed inside, thereby forming rolls 82. This is the state shown in FIG. 10(a). And from this state, each roll 82 is reversed over its base 84 to the side of the occupant-associated panel 14, thereby establishing the state shown in FIGS. 10(b) and 9(b). FIG. 9(a) and FIG. 10(b) each show the reverse roll type folding. In practice, for the sake of convenience of receiving the folded bag, the way of folding shown in FIG. 10(b) is employed more often. In the reverse roll type folding, even if the gas evolved in the inflator 20 pushes the occupant-associated panel 14 as indicated by the arrow in FIG. 10(a), the roll 82 is present on the side opposite to the direction of push, forming a resistance to prevent the occupant-associated panel 14 from readily moving forward. In contrast thereto, in the forward roll type folding, when the occupant-associated panel 14 is pushed in the direction of arrow, as can be seen from FIG. 11, the roll 81 is moved forward. After all, the occupant-associated panel 14 easily moves forward. Thus, the reverse roll type folding provides less easy unfolding than the forward roll type folding.

Figure 12A:
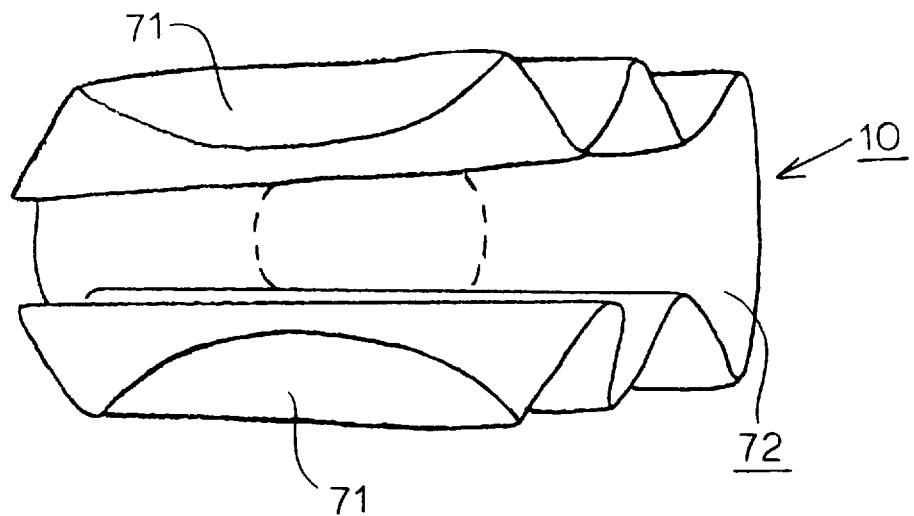
FIG. 12 is a view, similar to FIG. 8, showing a folding system for the bag of Comparative Example 2.
Figure 12B:
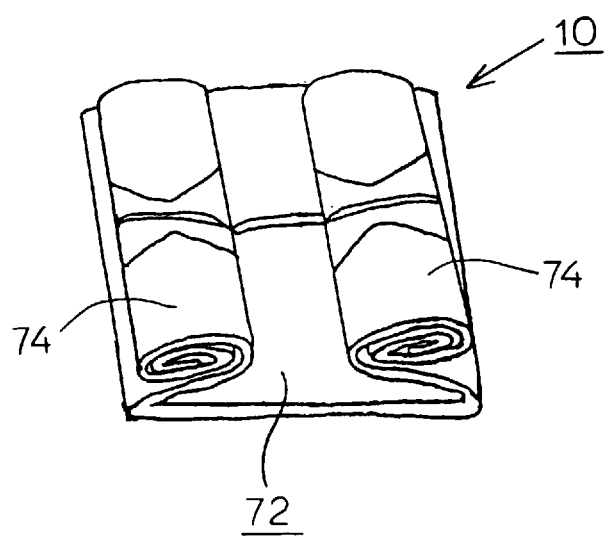

As Comparative Example 2, a bag having tethers but not having a flow regulator was used, and the folding method used was such that, as shown in FIG. 12, the upper and lower sides 71 of the bag were folded toward the occupant-associated panel 14 in a bellows fashion and then the opposite lateral sides 74 of the folded body 72 thus obtained were folded toward the occupant-associated panel 14 in a reverse roll fashion.

The bag of Example 2 has its deployment speed reduced as a whole as compared with the bag of Comparative Example 2. It was greatly reduced by about 65% particularly at a point where the deployment distance is 250 mm or thereabouts. The reason is that since the folding system which allows the bag to deploy with less ease is employed in the gas spouting direction, the gas flows relatively uniformly throughout toward the entire outer periphery of the bag, producing a decreased pushing force on the occupant-associated panel 14. In addition, the vertical deployment of the bag is also quick.

EXAMPLE 3

In Example 3, the spouting direction of gas from the flow regulator was horizontal i.e. the right and left direction and the folding system used was such that first, the upper and lower sides of the bag were folded in a bellows fashion and then the opposite lateral sides of the resulting folded body were folded in a reverse roll fashion. The width of the initial vertical spread of the bag at the beginning of deployment is greater in the case of Example 2. This shows that the vertical spread is a little quicker in the case of the bag of Example 2.

EXAMPLE 4

The bag used was the same as in Example 2 except that it has no tethers. The bag was folded as in Example 2. As compared with Comparative Example 2, the overall deployment speed is decreased. And it is seen that even if the bag has no tethers, since the folding system which allows the bag to deploy with less ease is employed in the spouting direction of gas from the flow regulator, there is obtained some effect of reduction of deployment speed; however, the deployment distance toward the occupant is substantially increased owing to the absence of tethers.

In addition, as Comparative Example 4, a bag was prepared on the basis of the bag of Example 2 such that the projecting height of the flow regulator exceeded ⅔ of the projecting height of the occupant-associated panel. Further, as Comparative Example 5, a bag was prepared on the basis of the bag of Example 2 such that the flow regulator covered only about 90% of the diameter of the inflator head. In each case, the deployment speed is generally high in contrast to Examples 1 and 2; it is high as compared with the bag of this invention particularly at a point where the deployment distance is approximately 250 mm.

Figure 13A:
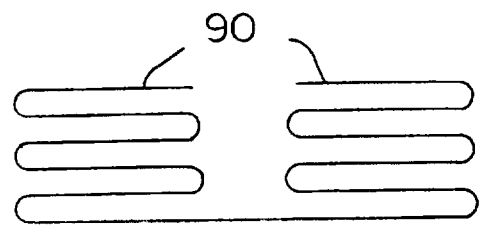
FIG. 13A–C is a schematic view showing various folding systems of bellows type.
Figure 13B:
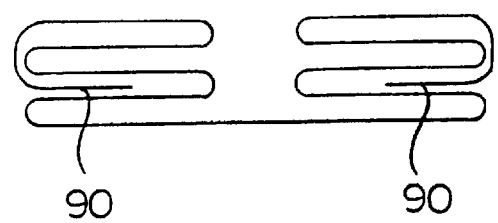
Figure 13C:
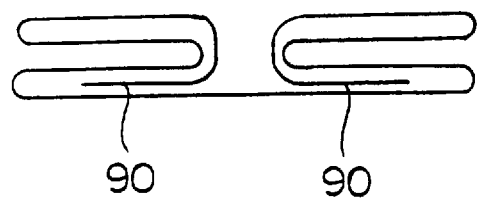

In Examples 2 and 3, the reverse roll type folding system was used as the folding system which allows the bag to deploy with less ease and the bellows type folding system was used as the folding system which allows the bag to deploy with ease. Alternatively, it is possible to use the reverse roll type folding system as the folding system which allows the bag to deploy with less ease and the forward roll type folding system (FIG. 11) as the folding system which allows the bag to deploy with ease. Further, FIG. 11(a) shows usual bellows type folding. FIG. 19(b) and (c) shows modification of the bellows type folding, wherein the front ends 90 are inserted into the bellows from outside or inside and held therein. Therefore, the systems shown in FIGS. 13(b) and (c) may be employed as systems which allow the bag to deploy with less ease and the one shown in FIG. 13(a) as a system which allows the bag to deploy with ease. Further, in Examples 2 and 3, the bag was folded first by the method allowing the bag to deploy with ease and then by the method allowing it to deploy with less ease; however, the order may be reversed. Further, in the bellows type folding, reverse roll type folding, and other forms of folding used in this invention, the bag is usually folded on the occupant-associated panel.

INDUSTRIAL APPLICABILITY

In the bag for a vehicle air bag device according to this invention, since the tethers are disposed at places clear of the spouting direction of gas from the flow regulator, the effect of flow regulation due to the flow regulator is not spoiled by the tethers, reliably leading the gas flow radially toward the outer peripheral edge of the bag. Thereby, the initial deployment speed of the bag moving toward the occupant-associated panel can be reduced.

Further, in the bag for a vehicle air bag device according to this invention, since the folding system which allows the bag to deploy with less ease is employed in the spouting direction of gas from the flow regulator, the gas flow can be uniformly lead sideways, thereby reducing the deployment speed of the bag moving toward the occupant-associated panel.

What is claimed is:

1. A bag for a vehicle air bag device comprising:
   an occupant-associated panel and an inflator-associated panel joined together along their peripheral edges to form said bag which is inflatable into a three-dimensional form;
   said inflator-associated panel having an inflator opening for attaching an inflator;
   a flow regulator freely displaceable away from the inflator a predetermined distance in a direction toward an occupant for diverting a gas flow from the inflator toward an outer periphery of said bag throughout a period of gas production by said inflator;
   tethers connecting said occupant-associated panel and said inflator-associated panel to prevent the spacing between the said occupant-associated panel and said inflator-associated panel from exceeding a predetermined length; and
   said tethers being disposed at positions not obstructing the flow of gas diverted by said flow regulator.

2. A bag for a vehicle air bag device comprising:
   an occupant-associated panel and an inflator-associated panel joined together along their peripheral edges to form said bag which is inflatable into a three-dimensional form;

said inflator-associated panel having an inflator opening for attaching an inflator:

a flow regulator for diverting a gas flow from the inflator toward an outer periphery of said bag;

said flow regulator including a sheet which covers said inflator opening;

said sheet having a middle portion bulging toward said inflator-associated panel during inflation of said bag;

said sheet having joined portions at a peripheral edge thereof joined at at least two places to said inflator-associated panel to form define diversion openings defined by portions of the peripheral edge of said sheet other than at said joined portions and said inflator-associated panel forms openings through which said gas flow is diverted;

tethers connecting said occupant-associated panel and said inflator-associated panel to prevent the spacing between the said occupant-associated panel and said inflator-associated panel from exceeding a predetermined length; and said tethers being disposed at positions not obstructing the flow of gas diverted by said flow regulator.

3. A bag for a vehicle air bag device as set forth in claim 2, wherein said tethers are joined to said inflator-associated panel at positions diametrically outside said joined portions.

4. A bag for a vehicle air bag device as set forth in claim 2, wherein said tethers include said joined portions and connecting members connected to said flow regulator and said occupant-associated panel.

5. A bag for a vehicle air bag device comprising:

an occupant-associated panel and an inflator-associated panel joined together along their peripheral edges form said bag which is inflatable into a three-dimensional form;

said inflator-associated panel having an inflator opening for attaching an inflator;

a flow regulator freely displaceable away from the inflator a predetermined distance in a direction toward an occupant for diverting a gas flow from the inflator toward a periphery of the bag throughout a period of gas production by said inflator;

said flow regulator having diversion openings facing sideways in opposite directions so that the gas is diverted in two mutually opposite directions toward an outer periphery of said bag;

a first pair of opposed sides of said bag being folded in said gas spouting direction and a second pair of opposed sides being folded in the direction orthogonal to said gas spouting direction; and the folding of said first pair of sides providing greater resistance to deployment than the folding of said second pair of sides.

6. A bag for a vehicle air bag device, comprising:

an occupant-associated panel and an inflator-associated panel joined together along their peripheral edges to form said bag which is inflatable into a three-dimensional form;

said inflator-associated panel having an inflator opening for attaching an inflator;

a flow regulator for diverting a gas flow from the inflator;

said flow regulator having diversion openings facing sideways in opposite directions so that the gas is diverted in two mutually opposite directions toward an outer periphery of said bag;

a first pair of opposed sides of said bag being folded in said gas spouting direction and a second pair of opposed sides being folded in the direction orthogonal to said gas spouting direction; and said second pair of sides being folded first in a bellows fashion and then said first pair of sides being folded in a reverse roll fashion such that the folding of said first pair of sides provides greater resistance to deployment than the folding of said second pair of sides.

7. A bag for a vehicle air bag device as set forth in claim 6, wherein said occupant-associated panel and said inflator-associated panel are connected together by tethers which prevent the distance between said occupant-associated panel and said inflator-associated panel from exceeding a predetermined length, said tethers being disposed at positions not obstructing gas flow diverted by the flow regulator.

8. A bag for a vehicle air bag device as set forth in claim 6, wherein a deployment height of said flow regulator is not more than $2/3$ of a deployment height of said occupant-associated panel.

9. A bag for a vehicle air bag device as set forth in claim 6, wherein a width of said flow regulator is greater than a diameter of a head of said inflator.

10. A bag for a vehicle air bag device as set forth in any one of claims 2 through 4 or claim 6, wherein said flow regulator is made of a material which is impermeable to gas.

11. A bag for a vehicle air bag device as set forth in claim 1 or 5, wherein said occupant-associated panel and said inflator-associated panel are connected together by tethers which prevent the distance between said occupant-associated panel and said inflator-associated panel from exceeding a predetermined length, said tethers being disposed at positions not obstructing gas flow diverted by the flow regulator.

12. A bag for a vehicle air bag device as set forth in claim 1 or 5, wherein a deployment height of said flow regulator is not more than $2/3$ of a deployment height of said occupant-associated panel.

13. A bag for a vehicle air bag device as set forth in claim 1 or 5, wherein a width of said flow regulator is greater than a diameter of a head of said inflator.

14. A bag for a vehicle air bag device as set forth in claim 1 or 5, wherein said flow regulator is made of a material which is impermeable to gas.

15. A bag for a vehicle air bag device as set forth in claim 1 or 5, wherein the deployment speed is 150 km/h or below at a point where the deployment distance is 200 mm or above.

* * * * *